United States Patent
Mensch et al.

(10) Patent No.: US 6,986,415 B2
(45) Date of Patent: Jan. 17, 2006

(54) PRESSURE PLATE ASSEMBLY FOR A FRICTION CLUTCH

(75) Inventors: Waldemar Mensch, Schweinfurt (DE); Sebastian Vogt, Bad Neustadt (DE); Andreas Orlamünder, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/718,067

(22) Filed: Nov. 20, 2003

(65) Prior Publication Data

US 2004/0140173 A1   Jul. 22, 2004

(30) Foreign Application Priority Data

Nov. 23, 2002 (EP) .................................. 02026124

(51) Int. Cl.
*F16D 13/44* (2006.01)

(52) U.S. Cl. .................. 192/89.23; 192/70.13; 192/70.27; 192/109 R; 192/DIG. 1; 29/446

(58) Field of Classification Search ............ 192/70.13, 192/70.27, 89.27, 109 R, DIG. 1, 89.23
See application file for complete search history.

(56) References Cited

U.S. PATENT DOCUMENTS

| | | | |
|---|---|---|---|
| 2,256,714 A | * | 9/1941 | Hunt ........................ 192/70.27 |
| 4,660,695 A | | 4/1987 | Fukatani |
| 4,697,685 A | * | 10/1987 | Bancroft ................. 192/109 R |
| 4,883,153 A | * | 11/1989 | Maucher et al. .......... 192/70.27 |
| 5,002,168 A | * | 3/1991 | Hrubesch ................. 192/70.27 |
| 5,400,887 A | | 3/1995 | Mizukami et al. |
| 5,950,786 A | | 9/1999 | Mahoney |
| 6,354,418 B1 | * | 3/2002 | Dalbiez .................... 192/70.13 |
| 6,409,002 B1 | * | 6/2002 | Orlamunder et al. ..... 192/70.17 |
| 2002/0144875 A1 | | 10/2002 | Dau et al. |

FOREIGN PATENT DOCUMENTS

DE   42 22 045 A1   1/1994

* cited by examiner

*Primary Examiner*—Richard M. Lorence
(74) *Attorney, Agent, or Firm*—Cohen, Pontani, Lieberman & Pavane

(57) ABSTRACT

A pressure plate assembly for a friction clutch includes a housing connectable with an abutment arrangement for rotation therewith about an axis of rotation. The housing has an outer axial side and an inner axial side. A pressure plate is mounted in the housing so that it faces the inner axial side. The pressure plate is rotatable with the housing about the axis of rotation. The pressure plate includes actuating sections which extend past a radially outer edge of the housing. An energy storage element is mounted on the outer side of the housing such that the energy storage device exerts a force on the actuating sections for urging the pressure plate away from the inner axial side. An assembly pretensioning arrangement is operative for holding the energy storage element in a pretensioned assembly position in which the energy storage device does not exert a force on the housing.

7 Claims, 3 Drawing Sheets

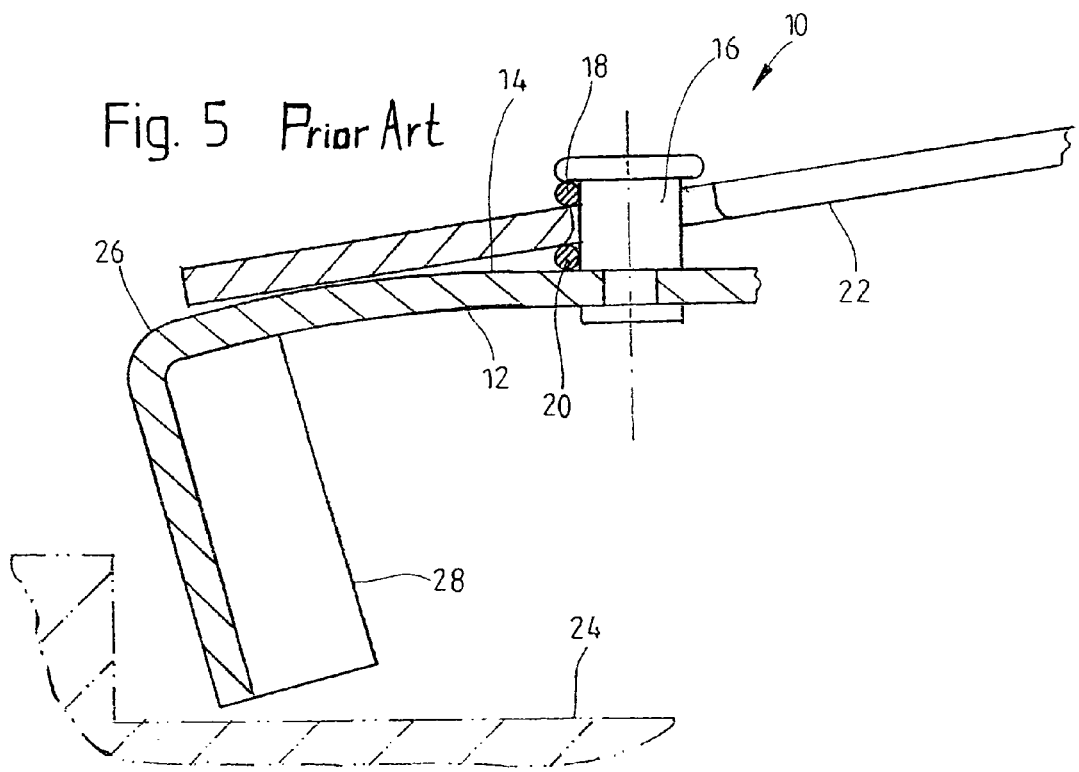
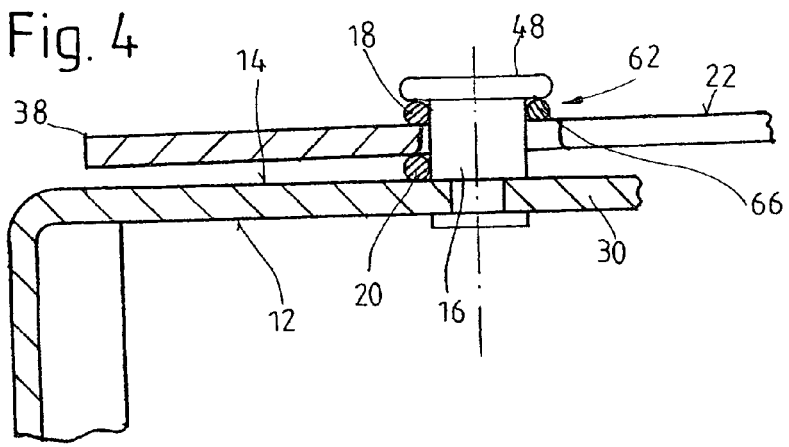

PRESSURE PLATE ASSEMBLY FOR A FRICTION CLUTCH

BACKGROUND OF THE INVENTION

1. Field of the Invention

The present invention pertains to a pressure plate assembly for a friction clutch, the pressure plate assembly including a housing that is connectable to an abutment arrangement for rotation in common around an axis of rotation, a pressure plate, mounted in the housing and capable of rotating together with the housing around the axis of rotation, and an energy storage element mounted on an outside surface of the housing so that it exerts a force on actuating sections of the pressure plate which extend across the edge of the housing.

2. Description of the Related Art

In pressure plate assemblies that are used in, for example, multi-disk friction clutches in which several clutch disks are stacked axially in a row and the torque to be transmitted via the clutch is transmitted via these several clutch disks, the energy storage element, which is usually designed as a diaphragm spring or disk spring, can be mounted on the outside surface of the housing to make more efficient use of the available space. In the state before the pressure plate assembly has been connected to an abutment arrangement such as, for example, a flywheel or the like, there is no reactive force present to oppose the engaging force transmitted by the energy storage element to the pressure plate. As a result, the energy storage element will relax until, for example, it comes to rest against the radially outer area of the housing. The engaging force exerted on the housing can deform the housing, thereby creating difficulties when the attempt is made to connect the housing to the abutment arrangement.

This potential deformation state is shown in simplified fashion in FIG. 5, which shows the housing 12 of a pressure plate assembly 10. An energy storage element 22 (shown, for example, as a diaphragm spring in FIG. 5) is arranged on an outer axial side 14 of the housing 12 and is supported by several spacer pins 16 and by two wire rings 18, 20. In the state before the housing 12 has been connected to an abutment 24 (shown schematically) the radially outer area of the energy storage element 22 exerts an engaging force as it relaxes on the radially outer area 26 of the housing 12, with the result that these radially outer areas 26 of the housing 12 are deformed by the force feedback thus produced. The sections 28 by which the housing is attached to the abutment may also deformed or at least slightly tilted, which makes it much more difficult to perform the assembly work. If, despite these difficulties, the housing 12 is bolted to the abutment 24 in this state, the housing 12 can relax as soon as the clutch thus assembled is disengaged the first time, and this can have the result that the bolts used to connect the housing 12 to the abutment 24 are no longer firmly tightened and can proceed to loosen.

SUMMARY OF THE INVENTION

The object of the present invention is to provide a pressure plate assembly and a method of assembling the pressure plate assembly which ensures that the required assembly work can be completed easily and reliably without the problems associated with the prior art.

This object is accomplished according to the present invention by a pressure plate assembly for a friction clutch which includes a housing that is connectable to an abutment arrangement for rotation therewith about an axis of rotation, the housing having an inner axial side, an outer axial side and a radially outer edge, a pressure plate is mounted in the housing so that it faces the inner axial side and so that it is rotatable together with the housing around the axis of rotation, the pressure plate having actuating portions extending past the radially outer edge. An energy storage element is mounted on the outer surface of the housing so that it can exert an engaging force on the actuating sections of the pressure plate which pass across the radially outer edge of the housing. An assembly pretensioning arrangement for holding the energy storage element in a pretensioned assembly position prevents the energy storage element from applying the engaging force to the housing.

The assembly pretensioning arrangement ensures that the energy storage element is held in a suitable state in which the entire pressure plate assembly can be mounted on an abutment arrangement. That is, the energy storage element is held in a position in which it cannot exert an unfavorable engaging force on the housing and cause its deformation.

The energy storage element may be supported by a plurality of carrier elements on the housing and the assembly pretensioning arrangement may comprise at least one assembly pretensioning element, by means of which the energy storage element is supported with respect to at least one carrier element in the pretensioned assembly position. This embodiment allows the energy storage element to be held in a simple and defined manner against its own pretension in the pretensioned assembly position. It can be provided, for example, that the at least one carrier element has a supporting expansion head at the end of the at least carrier element facing away from the housing and that the at least one assembly pretensioning element is positioned between the energy storage element and the supporting expansion head when the energy storage element is in the pretensioned assembly position.

A better distribution of the force required to hold the energy storage element in the pretensioned assembly position may be achieved by designing the assembly pretensioning element in the shape of a ring and by allowing it to interact with several carrier elements to hold the energy storage element in the pretensioned assembly position. The assembly pretensioning element preferably interacts with all of the carrier elements.

The assembly pretensioning element may be designed as an open, ring-shaped element capable of radial deformation to produce and release the pretensioned assembly position. This configuration allows the pretensioned assembly position can be produced and released very easily.

As already explained above, the present invention is especially effective when the pressure plate assembly is a multi-disk pressure plate assembly including an intermediate plate which is connected to the housing for rotation in common around the axis of rotation.

The present invention also relates to a process for bringing an energy storage element of a pressure plate assembly of a friction clutch mounted on an outside surface of a housing into an pretensioned assembly position and for holding it in that position. The inventive process includes the steps of exerting a force on the energy storage element to bring the energy storage element into a state of deformation corresponding approximately to a pretensioned assembly position, inserting at least one assembly pretensioning element into an intermediate space between the energy storage element and a supporting expansion head of at least one of the carrier elements which supports the energy storage element on the housing, and releasing the energy storage element so that it arrives in the pretensioned assembly position and is held in the pretensioned assembly position by the at least one assembly pretensioning element.

The present invention further relates to an assembly pretensioning element for a pressure plate assembly for implementing the process according to the invention. The assembly pretensioning element includes a ring-like pretensioning body with a break in its circumference which makes it possible for the assembly pretensioning element to be radially deformed for the production and release of the pretensioned assembly state.

The ends of the assembly pretensioning element next to the break in the circumference may be provided with actuating formations for the radial deformation to facilitate manual deformation of the assembly pretensioning element.

The assembly pretensioning element may, for example, be made out of a wire material.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 4 is a partial sectional view of the energy storage element of the pressure plate assembly of FIG. 1 in the pretensioned assembly position; and FIG. 5 is a partial sectional view of the energy storage element according to the prior art in a state in which the absence of an opposing force allows the energy storage element to exert an engaging force on the housing.

DETAILED DESCRIPTION OF THE PRESENTLY PREFERRED EMBODIMENTS

Figure 1:
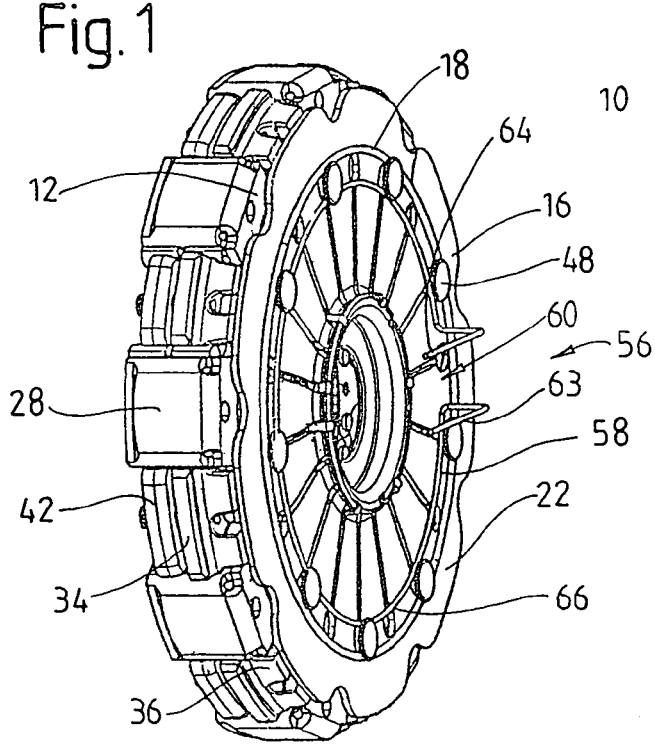
FIG. 1 is a perspective view a pressure plate assembly of a multi-disk clutch according to the present invention.
Figure 2:
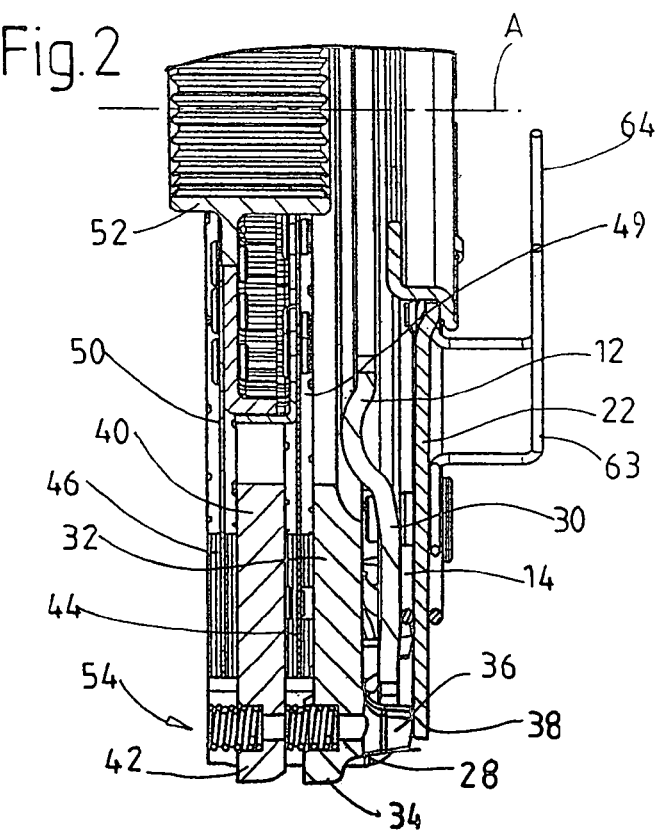
FIG. 2 is a partial longitudinal sectional view of the pressure plate assembly of FIG. 1.
Figure 3:
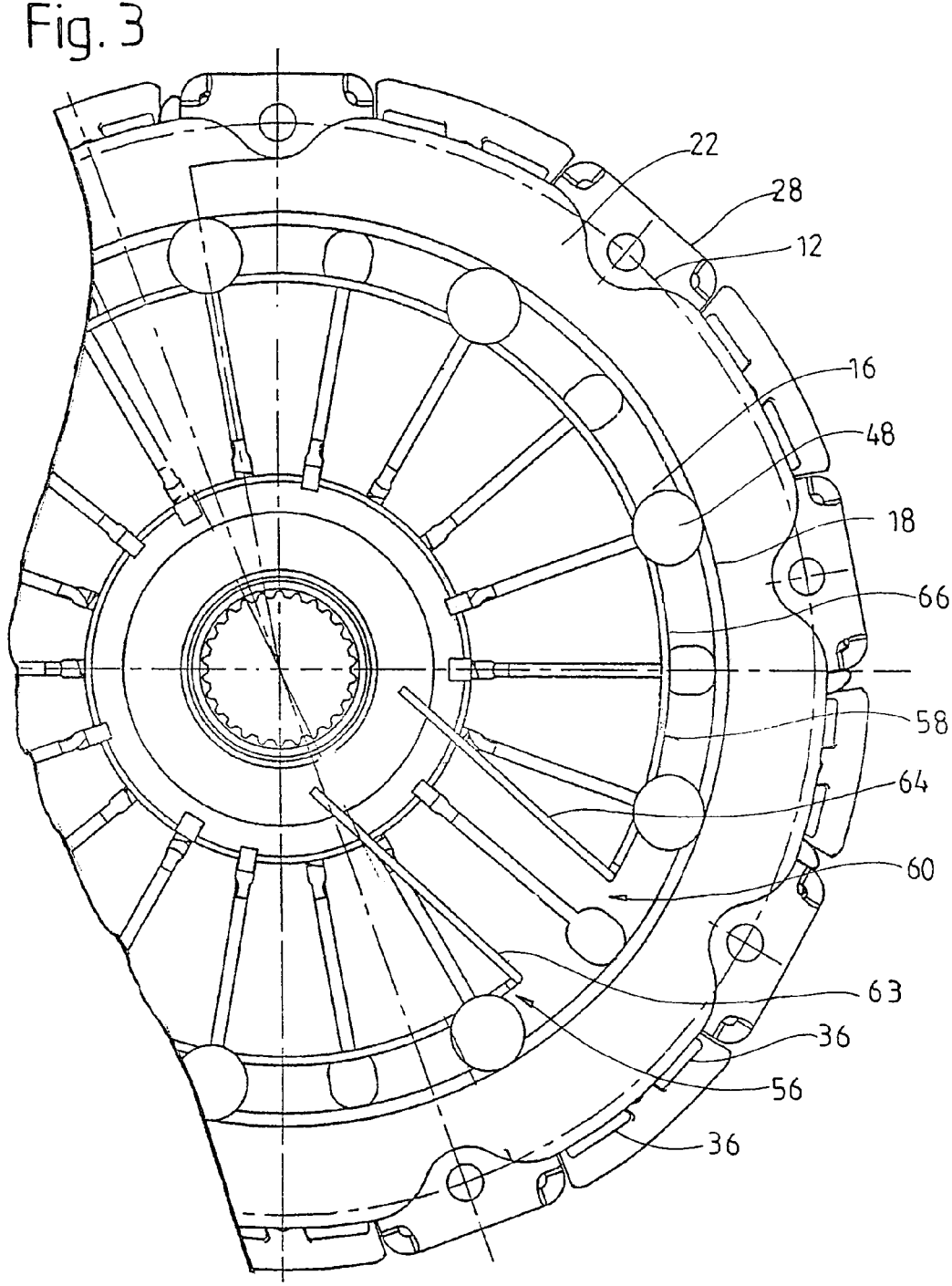
FIG. 3 is a partial axial view of an outer axial side of the pressure plate assembly of FIG. 1.

With reference to FIGS. 1 and 2, a pressure plate assembly 10 for a multi-disk clutch includes a housing 12 designed essentially in the form of a cup having a bottom area 30. Adjacent to the radially outer edge of the bottom area 30, several sections 28 of the housing 12 are distributed around the circumference. Threaded bolts can be passed through these sections to fasten the housing 12 to an abutment plate (not shown in FIG. 1 and 2). The entire housing 12, including its bottom area 30 and the sections 28, is formed by the shaping of sheet-metal stock.

A pressure plate 32 is mounted in the housing 12. The pressure plate 32 includes radially outward-extending connecting projections 34 in several circumferential areas, which fit between the sections 28 of the housing 12 to produce a connection with respect to rotation between the housing 12 and the pressure plate 32. Accordingly, the housing 12 and pressure plate 32 rotate in common. The pressure plate 32 also has several actuating sections 36, which pass across the radially outer edge of the bottom area 30 of the housing 12. The radially outer area 38 of the energy storage element 22, which is mounted on an outer axial side 14 on the bottom area 30 of the housing 12, exerts force on these actuating sections 36 and thus presses the pressure plate 32 in the axial direction away from the bottom area 30 of the housing 12.

The pressure plate assembly 10 also includes an intermediate plate 40 a certain axial distance away from the pressure plate 32. The intermediate plate 40 also has connecting projections 42 in several circumferential areas. In this way, the intermediate plate 40 is also connected to the housing 12 for rotation in common around the axis of rotation A. Friction lining arrangements 44, 46 of two clutch disks or clutch disk areas 49, 50 are mounted between the pressure plate 32 and the intermediate plate 34 on the one hand and between the intermediate plate 40 and an abutment (not shown) on the other. The central hub area 52 of these clutch disks 49, 50 is connected or connectable to a shaft (not shown) having an axis of rotation so that the clutch disks can rotate in common. A releasing force-producing arrangement 54 is supported between the abutment and the intermediate plate 40 and also between the intermediate plate 40 and the pressure plate 32. The releasing force-producing arrangement 54 ensures that the intermediate plate 40 and the pressure plate 32 move far enough away from the surfaces which interact frictionally with them when a clutch-releasing operation is performed.

As shown in FIG. 4, the energy storage element 22 is supported by plurality of fastening pins 16, i.e., spacer pins, arranged in a row in the circumferential direction on the bottom area 30 of the housing 12. These spacer pins 16 have expanded head areas or supporting areas 48 at the end of the spacer pins 16 which face away from the bottom area 30. The two wire rings 18, 20, already mentioned in connection with FIG. 5, pass around the outside of the ring of spacer pins 16, so that the energy storage element 22 is held axially between the bottom area 30, i.e., the outer axial side 14 of the bottom area 30, and the supporting sections 48 of the spacer pins 16 and can therefore pivot around the contact points with these wire rings 18, 20 during the performance of clutch-engaging and clutch-releasing operations.

To avoid the problem described above associated with the prior art, that is, to prevent the radially outer area 38 of the energy storage element 22 from exerting an engaging force on the housing 12 in a state before it is possible to generate an opposing force, an assembly pretensioning arrangement 56 is provided according to the invention. The pretensioning arrangement 56 comprises a ring-shaped element 58, formed out of wire, which forms a ring-shaped body 66 that has a break 60 in its circumference. In the area of this circumferential break, the ring-shaped element 58 has two actuating sections 63, 64, which are produced by bending sections of wire out from the plane of the ring-shaped body 66 and over so that they are essentially perpendicular to that plane. The actuating sections 63, 64 represent handles of the pretensioning arrangement 56. The ring-shaped element 58 can be designed so that its own elasticity pretensions it into a certain radial configuration in which the ring-shaped body 66 has a dimension which, relative to the axis of rotation A, i.e., central axis of the pressure plate assembly 10, is at least slightly larger than a circular line defined by the radially inward-situated side of the spacer pins 16.

To bring the energy storage element 22 into the pretensioned assembly position shown in FIG. 4, the radially inner area of the energy storage element 22 is subjected to a force relative to the housing 12 in the conventional manner so that an intermediate space 62 (see FIG. 4) is produced between the support sections 48 of the spacer pins 16 and the energy storage element 22. The two sections 63, 64 of the ring-shaped element 58 are then pulled together so that at least locally the radius of the ring-shaped element 58 is decreased. While the ring-shaped element 58 is held in this state, it is introduced into the intermediate spaces 62 produced at the spacer pins 16. To make it easier to accomplish this insertion, the energy storage element 22 is deformed to such an extent that these intermediate spaces 62 are at first slightly oversized with respect to the diameter of the ring-shaped element 58 of the ring-shaped body 66. Once the ring-shaped element 58 has reached the position shown also in FIG. 1, the sections 63, 64 may be released which allows the ring-shaped element 58 to expand radially. The ring-shaped body 66 now arrives in all of the other intermediate spaces 62. When the energy storage element 22 is subsequently released, the areas of the energy storage element 22 located radially inside the spacer pins 16 move back again slightly in the direction away from the bottom 30 of the housing 12, until they come to rest against the ring-shaped body 66 of the ring-shaped element 58. In this state, the ring-shaped element 58 prevents further relaxation of the energy storage element 22 which is also supported by the wire ring 20 supported on the outer axial side 14 of the bottom area 30. The force feedback occurs via the spacer pins 16 themselves, so that it is impossible for a force large enough to deform the housing 12 to be introduced into it.

In the pretensioned assembly state shown in FIG. 4, an axial gap is arranged between the radially outer area 38 of the energy storage element 22 and the housing 12. When the pressure plate assembly 10 is brought up to its abutment, the housing 12 may be positioned correctly on this abutment and connected to it using threaded connectors such as, for example, screws. After these two components have been connected together, the ring-shaped element 58 may be removed by first exerting force on the radially inner part of the energy storage element 22 to release its clamping action on the ring-shaped body 66. Then the sections 63, 64 of the ring-shaped element 58 may be pulled toward each other again, so that the ring-shaped element 58 emerges from some of the intermediate spaces 62. By tilting and pulling, the ring-shape element may be removed from all of the other intermediate spaces 62.

It should be pointed out that the clamping action between the energy storage element 22 and the spacer pins 16 described above could also be accomplished by other types of intermediate elements. In particular, it is not mandatory to use a single element of this type.

For example, it would be possible to use a separate assembly pretensioning element on one or more of the spacer pins 16.

The assembly pretensioning arrangement 56, as described above, may be used to advantage not only the first time that the pressure plate assembly is put together but also, as should be obvious, when it is necessary to make repairs. In all cases, the advantage is obtained that the pressure plate assembly 10 does not have to be connected to its abutment while it is being subjected to the force produced by the energy storage element 22.

The pressure plate assembly shown in the figures is obviously only one example of a pressure plate assembly to which the principles of the invention can be applied. Many parts of the pressure plate assembly such as the energy storage element, the pressure plate, and the intermediate plate can be modified. It is obvious, for example, that the sections 36 extending past the edge of the housing could also be components of the energy storage element, the radially outer area of which would be provided with corresponding deformations or fastened-on parts. The housing could also be designed differently. For example, its outer circumferential area could have a flange-like section, by means of which it is connected to an abutment plate or the like. In addition, the connection of the pressure plate and possibly of an intermediate plate to the housing for rotation in common could be accomplished in some other way such as, for example, by the use of tangential leaf springs or other connection which prevent relative rotation but allow limited axial movement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for a friction clutch, comprising:
    a housing connectable with an abutment arrangement for rotation therewith about an axis of rotation, the housing having an outer axial side and an inner axial side;
    a pressure plate mounted in said housing facing said inner axial side such that said pressure plate is rotatable with said housing, said pressure plate having actuating sections extending past a radially outer edge of said housing;
    an energy storage element mounted on said outer side of said housing such that said energy storage device exerts an engaging force toward said housing and onto said actuating sections for urging said pressure plate away from said inner axial side;
    a plurality of spacer pins arranged on said housing for supporting said energy storage element, each of said spacer pins including a support area at an end facing away from said housing; and
    an assembly pretensioning arrangement for holding said energy storage element in a pretensioned assembly position in which the engaging force is prevented from acting on said housing, said assembly pretensioning arrangement including at least one assembly pretensioning element positioned between said energy storage element and said supporting area of said each of said spacer pins so that a force feedback of the energy storage element occurs through the spacer pins themselves when said energy storage element is in the pretensioned assembly position, whereby the force feedback is prevented from deforming the housing.

2. The pressure plate assembly of claim 1, wherein said at least one assembly pretensioning element is an open ring-shaped element and is radially deformable for producing and releasing the pretensioned assembly position.

3. The pressure plate assembly of claim 1, wherein said pressure plate assembly is a multi-disk pressure plate assembly further comprising an intermediate plate connected to said housing for rotation with said housing and said pressure plate about said axis of rotation.

4. A process for bringing an energy storage element of a pressure plate assembly of a friction clutch into a pretensioned assembly position and holding the energy storage element in the pretensioned assembly position, the energy storage element being connected on an outer axial side of the housing of the pressure plate assembly, the method including the steps of
- exerting a force on the energy storage element to bring the energy storage element to a state of deformation which produces an intermediate space between the energy storage element and a support area of a spacer pin which supports the energy storage element on the housing;
- inserting at least one assembly pretensioning element into the intermediate space; and
- releasing the energy storage element so that the energy storage element arrives in the pretensioned assembly position against the at least one assembly pretensioning element and so that a force feedback of the energy storage element occurs through the spacer pins themselves, whereby the force feedback is prevented from deforming the housing.

5. In a pressure plate assembly having a housing connectable with an abutment arrangement for rotation therewith about an axis of rotation, the housing having an outer axial side and an inner axial side, a pressure plate mounted in said housing facing said inner axial side such that said pressure plate is rotatable with said housing, said pressure plate having actuating sections extending past a radially outer edge of said housing, an energy storage element mounted on said outer side of said housing such that said energy storage device exerts a force toward said housing on said actuating sections for urging said pressure plate away from said inner axial side, and a plurality of spacer pins arranged on said housing for supporting said energy storage element, each of said spacer pins including a support area at an end facing away from said housing, an assembly pretensioning element comprising a ring-shaped pretensioning body with a break in its circumference, the break allowing the assembly pretensioning element to be radially deformed to produce and to release a pretensioned assembly state, said assembly pretensioning element being positionable between said energy storage device and said supporting area of said each of said spacer pins in the pretensioned assembly state so that a force feedback of the energy storage device occurs through the spacer pins themselves when said energy storage element is in a pretensioned assembly position, whereby the force feedback is prevented from deforming the housing.

6. The assembly pretensioning element of claim 5, further comprising handle formations at ends next to the break in the circumference to facilitate the radial deformation.

7. The assembly pretensioning element of claim 5, wherein said assembly pretensioning element is made of wire.

* * * * *